Dec. 23, 1969     D. H. REIFF     3,485,330
SELF-ADJUSTING CLUTCH OR BRAKE
Filed Feb. 17, 1969     3 Sheets-Sheet 1
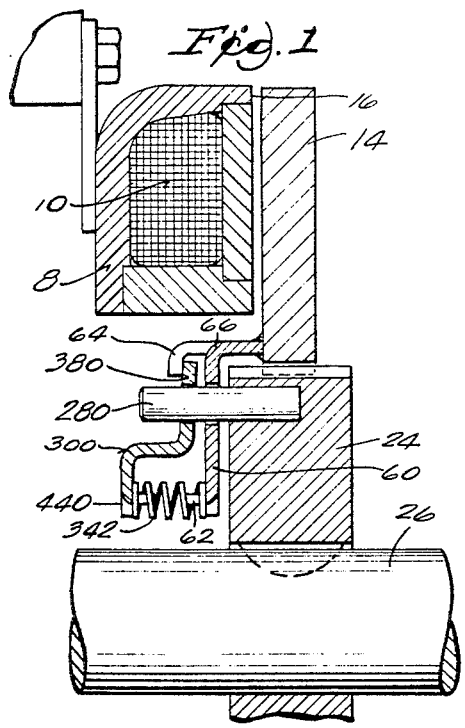
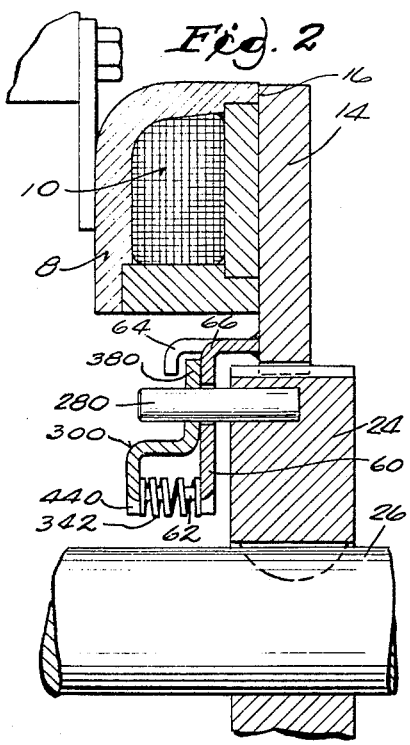
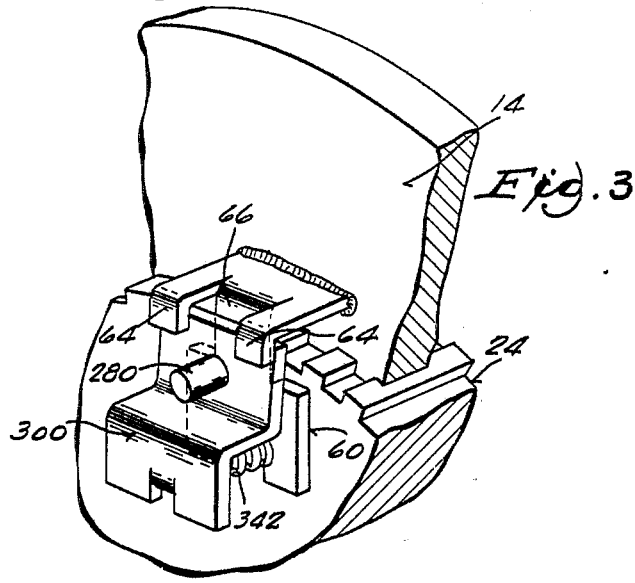
INVENTOR
DONALD H. REIFF
BY Wheeler, Wheeler, House & Clemency
ATTORNEYS

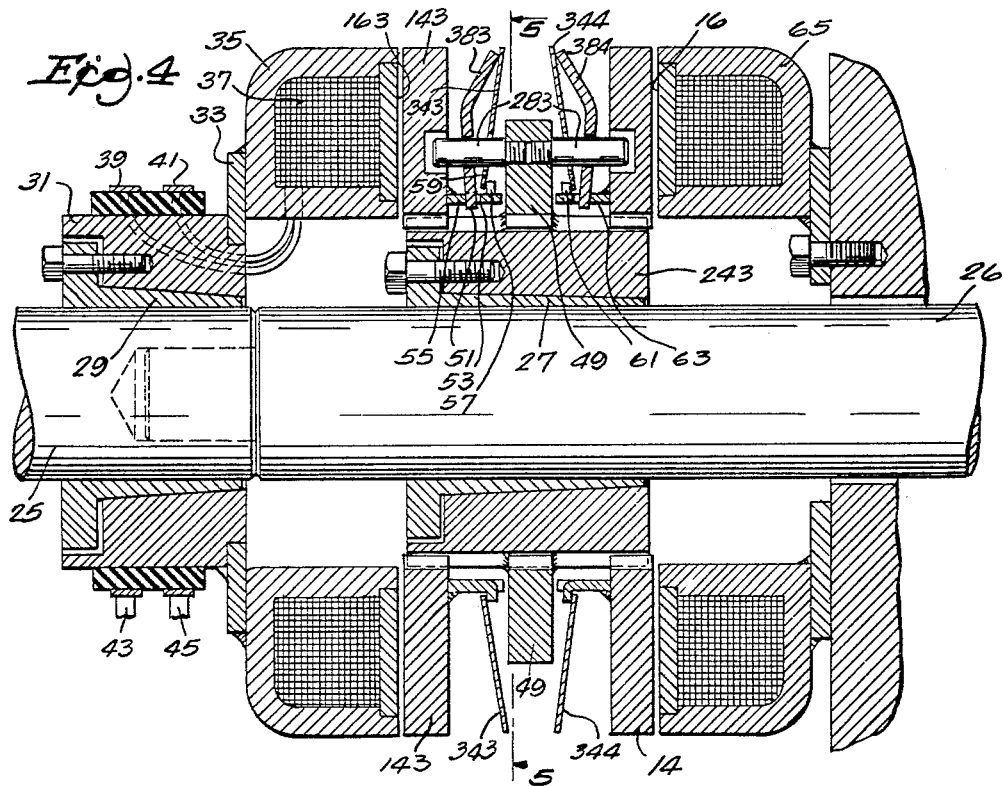
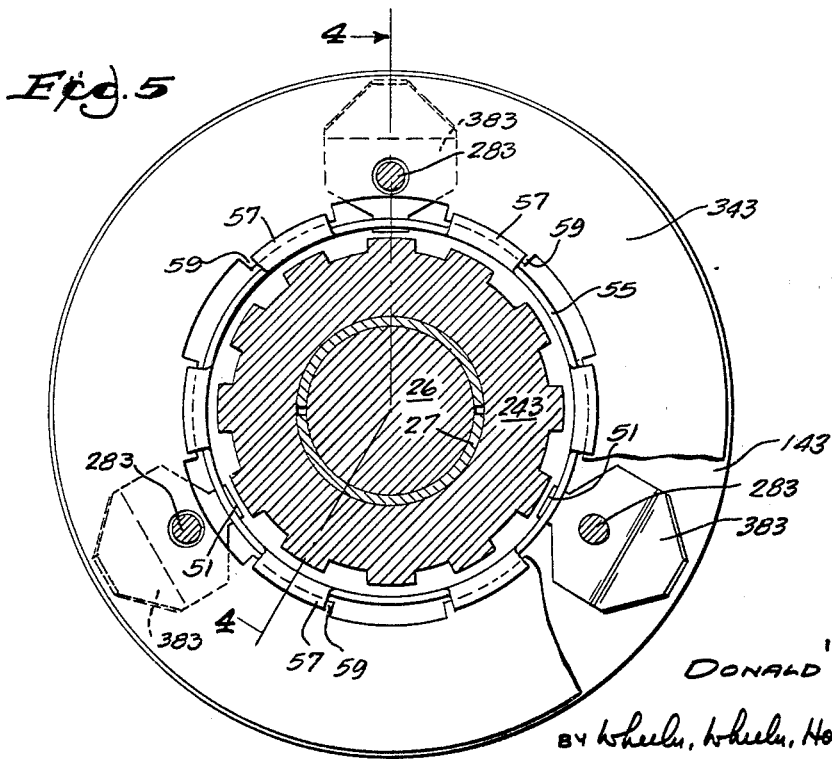

Dec. 23, 1969　　　　　D. H. REIFF　　　　　3,485,330
SELF-ADJUSTING CLUTCH OR BRAKE
Filed Feb. 17, 1969　　　　　　　　　　　　　3 Sheets-Sheet 3
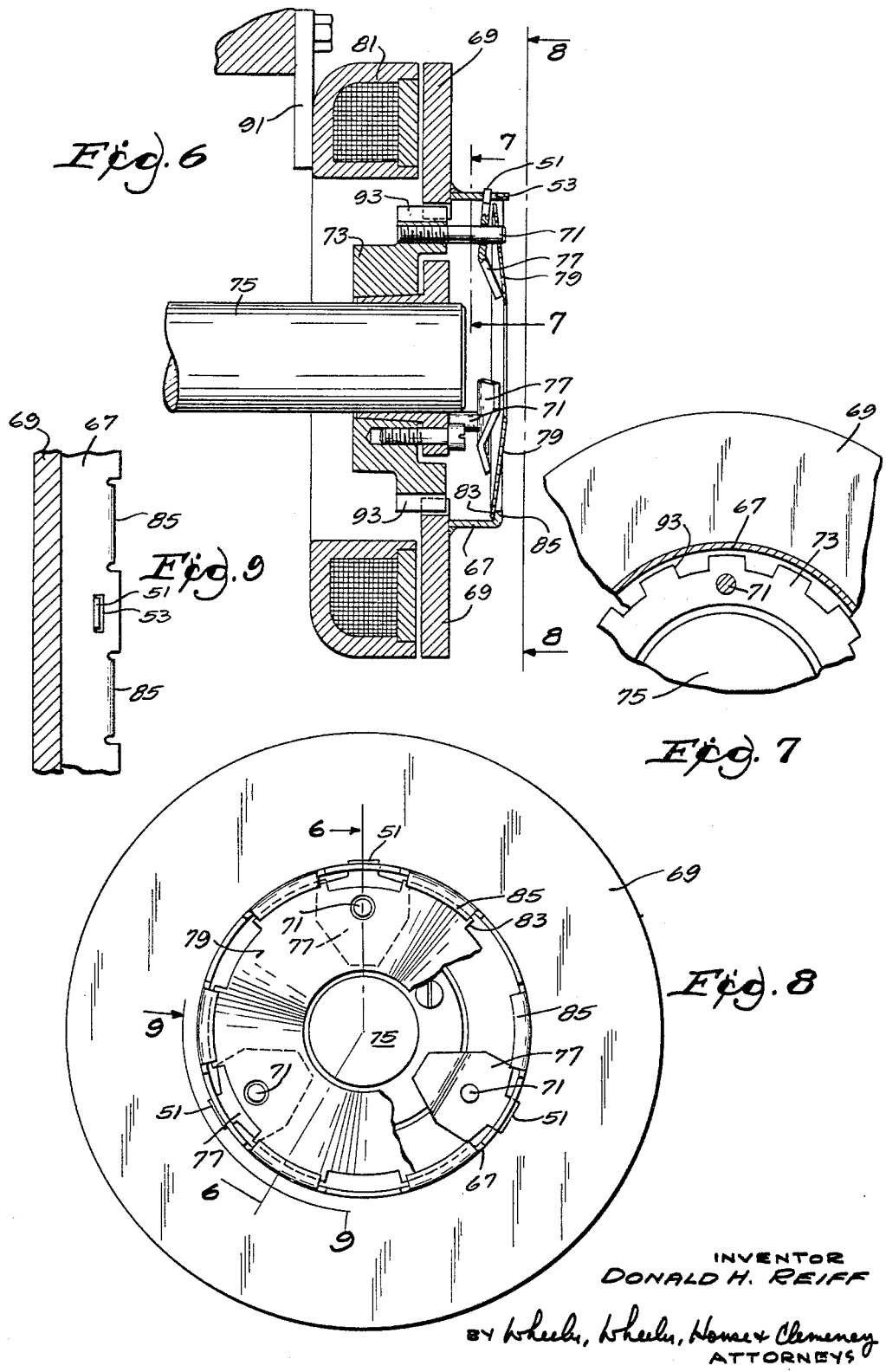
INVENTOR
DONALD H. REIFF
BY Wheeler, Wheeler, House & Clemency
ATTORNEYS

United States Patent Office 3,485,330
Patented Dec. 23, 1969

3,485,330
SELF-ADJUSTING CLUTCH OR BRAKE
Donald H. Reiff, Cedarburg, Wis., assignor to Stearns Electric Corporation, Milwaukee, Wis., a corporation of Wisconsin
Continuation-in-part of application Ser. No. 667,226, Sept. 12, 1967. This application Feb. 17, 1969, Ser. No. 799,889
Int. Cl. F16d 27/00, 13/22, 55/00
U.S. Cl. 192—84                                                    10 Claims

ABSTRACT OF THE DISCLOSURE

An armature-retracting spring acts through a motion limiting plate normally cramped on a post which is fixed to the hub. When armature movement becomes greater due to wear, the plate engages a stop which releases its cramping action to permit independent relative movement of the armature, thereby readjusting the range of armature operation.

Background of invention

The present application is a continuation in part containing claims divided from application Ser. No. 667,226, filed Sept. 12, 1967 entitled "Self-Adjusting Clutch or Brake." As in the parent application above identified, it is an objective of the invention to have the construction responsible for self-adjustment operate virtually without friction whenever a need for adjustment develops.

Summary of invention

The coupling device may be regarded either as a clutch or a brake depending on whether the clutch plate which serves as an armature is frictionally engageable with a relatively fixed part rather than a rotatable part. In both cases it is a clutch in fact. The drawings illustrate both uses of the coupling.

The armature reciprocates axially in advancing toward and retracting from the part which it engages. Its retraction is spring biased and the object of the invention is to control the range of its movement so that it cannot exceed a predetermined maximum retraction. The range would increase with wear but for the present invention which provides stop mechanism that adjusts itself as wear occurs.

The biasing spring which retracts the armature may be of any appropriate type. Disclosed herein are both coil springs and disk springs.

The action or reaction of the spring is exerted on a plate which is normally held by the spring reaction in a position in which the plate is slightly tilted with reference to a post fixed to the hub. The tilting of the plate respecting the post cramps the plate to lock it to the post. In the event of clutch wear, the plate engages a stop which, upon contact with the plate, releases the cramping action to permit the slight independent movement of the armature which is required to readjust the range to compensate for the wear. Since the plate is not required to flex in order to bring about this result, the instant device is free of fatigue breakage.

Axially fixed stops are engaged by the plate in both extremes of its movement. When it engages the stop most remote from the armature, the cramping action on the post is increased, thereby positively limiting armature movement. If the other stop is engaged, the cramp plate is relieved of cramping action on the post, thereby permitting the armature to continue its advance if it has become excessively spaced from the complementary clutch surface.

The instant device differs from the device of the parent application in that the post is mounted on a hub with respect to which the armature is reciprocable and the stops are connected with the armature. The construction shown in the parent application operates satisfactorily when there is not excessive armature vibration. However, the construction of the present application will function properly despite frequency or other vibration because the post is carried by the hub rather than by the armature.

Brief description of drawings

FIG. 1 is a fragmentary view in axial section illustrating parts with coil spring retraction as they appear with the armature in its fully retracted position.

FIG. 2 is a view similar to FIG. 1 showing the parts in a position of automatic self-adjustment.

FIG. 3 is a fragmentary detail view of the embodiment of FIG. 1 in perspective.

FIG. 4 is a view in axial section through a combination brake and clutch having two separate self-adjusting electromagnetic coupling devices for connecting the driven shaft selectively either to a driving shaft or to a fixed surface.

FIG. 5 is a view taken in section on the line 5—5 of FIG. 4, parts being broken away.

FIG. 6 is a view in axial section through a device in which the coupling acts as a brake.

FIG. 7 is a fragmentary detail view taken on the line 7—7 of FIG. 6.

FIG. 8 shows the device of FIG. 6 in end elevation from the viewpoint of line 8—8 in FIG. 6.

FIG. 9 is a fragmentary enlarged detail view on the line 9—9 of FIG. 8.

Description of preferred embodiment

It will be understood that several of the drawings show only portions of the device. FIGS. 1–3 appeared in the parent application and will be discussed first.

In practice, the magnet frame 8 and the coil 10 therein are annular and the hub 24 and the armature disk 14 is likewise annular. Coupling is effected by engagement of the face of the armature with the face 16 of the magnet. At peripherally spaced points, there will be a number of the posts 280 and the associated arms 66 fixed to the armature 14, and cramping plates 300 and springs 342.

Each of the posts 280 is fixed to the hub 24 to rotate with shaft 26. The armature and coupling disk 14 is splined to the hub to rotate therewith and for axial movement to and from the clutch surfaces 16 on the magnet body 8. The device uses compression springs 342 to bias the armature 14 away from the magnet body 8. Each spring 342 is provided at one end with a seat on an arm 60 extending from the armature. The arm has a spring-positioning pin at 62. The end of spring 342 remote from the hub 24 is similarly seated on the lower extremity 440 of the plate 300. The plate is S-shaped, its lower extremity 440 preferably being offset to accommodate the length of the spring 342 so that the assembly will be compact.

The showing of spring seat part No. 60 is diagrammatic; in practice, this is annular.

The cramping plate 300 is normally held in a cramped position in which it is slightly inclined to the post, being based to that position by the reaction of spring 342 as the spring exerts bias through arm 60 to effect retractive movement of the armature. When the armature is retracted from engagement with the complementary friction surface 16, the stop finger 64 will engage the upper end 380 of cramping plate 300. This positively locks the armature 14 and arm 60 against any further retractive movement to the right as viewed in FIG. 1.

When the range of movement of the armature is not excessive, the magnetically attracted disk 14 which serves both as a coupling disk and armature can engage the friction surfaces 16 without straightening the cramping plate 300 on the post 280. However, when the range of movement of the armature disk 14 becomes enlarged due to wear, the movement of the armature toward the magnet will cause the elbowed portion 66 of the arm 60 to engage the outer end 380 of the cramping plate 300. This will overcome the spring pressure on the plate to move the plate toward a position normal to the post. In this position, the plate will move virtually without friction on the post 280 and is readily displaced thereon during the completion of movement of brake disk 14 into contact with the fixed brake surface 16 in response to the energization of the electromagnet. This automatically readjusts the range of armature movement (this is somewhat exaggerated in FIG. 2).

It will be understood that similar readjustment is occurring concurrently at each of the peripherally spaced locations where assemblies of posts 280, cramping plates 300, arms 60, and springs 342 are provided to bias the armature-clutch disk 14. In practice, three such assemblies have been used as suggested in the parent application above identified. In the parent application, the stops are relatively fixed and the springs act through the cramping plates upon the posts, the posts being carried by the clutch-armature disk. In the instant device, the posts are relatively fixed and the springs seat thereon through the cramping plates and transmit their bias to the disk through stop arms fixed to the disk.

As shown in FIG. 4, the driven shaft 26 may be selectively coupled to the drive shaft 25 or to a braking surface. The hub 243 is mounted on shaft 26 by a conical wedge 27.

A similar wedge at 29 mounts the hub 31 on the drive shaft 25. The annular magnet 35 is carried from hub 31 by means of flange 33, its coil 37 being supplied with current by conventional slip rings 39 and 41 encircling the hub 31 and energized by brushes 43 and 45, respectively.

In the construction shown at the left in FIG. 4, and also shown in FIG. 5, armature disk 143 is splined to the hub 243 on driven shaft 26 for axial movement to and from coupling engagement with the face 163 of the magnet. Posts 283 project axially from the hub flange 49 and are crampingly engaged by cramp plates 383. The inner ends of these cramp plates have tongues 51 loosely engaged in slots 53 in sleeve 55 welded to the armature disk 143. The outer ends of the cramp plates provide spring seats for the disk spring 343. On the inner perimeter of the disk are portions 59 engaged with lugs or flanges 57 on the sleeve or annulus to exert bias on the armature 143 in a direction to retract it from the magnet frame 35.

The several lugs 57 are angularly spaced to enable the spring portions 59 to be rotatively engaged interlockingly behind the several flanges 57 as clearly shown in FIG. 5. It will be noted from FIGS. 4 and 9 that the slots 53 are wider than the thickness of the tongues 59. Thus, in the normal range of movement of the armature disk 143 toward the magnet frame 35, the sleeve 55 will advance until the margin adjacent opening 53 strikes the righthand side of the cramp plate tongues 59 (as viewed in FIG. 4). If the range of movement has become excessive, so that the armature continues its movement toward coupling position after the sleeve strikes the cramp plates, the result will be to straighten up the cramp plates and thus eliminate cramping engagement of the several such plates with their respective posts 283. This permits the spring reaction to move axially toward the magnet the seats provided for the spring at the outer ends of the cramp plates. Bias of the spring on the armature is thus automatically relieved and automatically a new range of movement of the parts is established. At the same time the disk 143 is coupled frictionally with the solenoid frame 25 to transmit rotative motion through the coupling armature 143 and the hub 243 to the driven shaft 26.

As soon as the coil 37 is deenergized and the spring 343 acts to withdraw the armature disk 143 from contact with the magnet frame 35, the margin of the sleeve at the other side of the tongue 51 will engage such tongue to restore each cramp plate to its cramped position on the post thereby to provide fixed seats from which the spring 343 can bias the armature in a retractive direction.

The brake structure shown at the right in FIG. 4 functions similarly. The posts 284 are mounted on the hub flange 49. The spring disk 344 seated against cramp plates 384 acts resiliently against the flanges 61 on the ring or sleeve 63 welded to the armature 16. When the magnet 65 is energized, it attracts the armature 16 against the bias of the spring 344. If no excessive wear has occurred, the range of adjustment of the armature 16 is unchanged. If there has been excessive wear, the tongues on the cramp plates are engaged by the outer sides of the slots in the sleeve 63 and the cramp plates are thereby released from cramping engagement with the posts 284 to permit such plates to move to a new position and restore the desired range of movement in the manner above described.

The assembly shown in FIG. 4 selectively permits the shaft 26 to be driven from the shaft 25 if the magnet 35 is energized or be brought to a stop independently of shaft 25 if the magnet 65 is energized.

In the device shown in FIGS. 6 to 8, the sleeve 67 connected with the armature 69 is radially outside of the posts 71 mounted on hub 73 of shaft 75. Each of the cramp plates 77 on the several posts 71 provides a seat for the disk spring 79 to enable such spring to bias the armature 69 in a retractive direction away from the magnet frame 81. As best shown in FIG. 6, the bias of the disk spring 79 is transmitted to the armature 69 by means of peripherally spaced axially projecting spring portions 83 which are engaged behind flanges 85 at the outer end of the sleeve 67.

The engagement of the tongues 51 of the cramp plates 77 in the slots 53 of sleeve 67 is the same as above described. In the retractive movement of the armature 69 the cramp plates provide fixed seats for the retractive spring 79. The plates remain cramped on the posts when the armature is attracted by the magnet unless the desired range is exceeded. In that case, the cramp plates are engaged by the outer side margins of slot 53 to straighten them and thereby to release them from the posts 71 to permit the armature to complete its movement into frictional engagement with magnet frame 18.

The magnet frame is fixed by means of bracket 91. The armature is axially movable along the spline 93 of hub 73. Thus in this particular embodiment the coupling acts as a brake to restrain the rotation of shaft 75 when the magnet is energized.

I claim:
1. A coupling device comprising a magnet, an armature, a hub upon which the armature is mounted for rotation and for movement to and from frictional engagement with the magnet, a plurality of posts projecting axially from the hub, cramping plates upon the respective posts, armature biasing spring means for which the cramping plates provide seats when cramped upon their respective posts, and means for releasing the cramping of the respective plates upon their respective posts to permit readjustment of the spring seats when a given range of axial movement of the armature is exceeded.

2. A coupling device according to claim 1 in which the spring means comprise helical springs individually engaged with respective cramping plates and in biasing engagement with said armature for biasing the armature away from the magnet.

3. A coupling device according to claim 1 in which the spring means comprises a disk spring having relatively radially offset portions respectively in thrust connection with the plates and with the armature.

4. A coupling device according to claim 3 in which the portions of the disk spring in thrust connection with the armature are at the outer periphery thereof.

5. A coupling device according to claim 3 in which the portions of the disk spring in thrust connection with the armature are at the inner periphery thereof.

6. A friction clutch for electromagnetic engagement and comprising a first clutch element, an electromagnet coil, an armature disk comprising a second clutch element and attracted toward said first clutch element when the magnet coil is energized and having a friction surface complementary to said first element, means including a hub member for supporting the disk for rotation and for relative axial advance to a position for engagement of said armature disk and said first element and for retraction from such engagement, and automatically adjustable means for defining the range of such advance and retraction, said means including an axially projecting post on the hub member, a cramping plate mounted on the post for free relative movement along the post in a first position normal with respect to the post and having parts crampingly engaged with the post in a tilted position of said plate with respect to the post, an arm connected with the armature disk and having a portion projecting therefrom into the path of said plate, an armature-biasing compression spring having a seat on said plate and another seat on said arm and constituting means for urging said plate to its tilted position and said disk to retracted position, said arm comprising stop means engaged by the plate after predetermined relative movement of the disk toward said first element when said disk is attracted by the magnet, engagement of said stop means with the plate being adapted to effect movement of the plate to its first position in opposition to the bias of said spring for permitting free movement of said armature and post relative to said plate, whereby ensuing relative movement between the plate and post effects readjustment of said range.

7. A friction clutch according to claim 6 in which said arm has a second portion projecting beyond said plate and provided with a downturned finger spaced from said first portion, said finger and first portion lying at opposite sides of said plate.

8. A friction clutch according to claim 6 in which said arm has a second portion projecting beyond said plate and provided with a downturned finger spaced from said first portion, said finger and first portion lying at opposite sides of said plates, the plate having an offset at the other side of the post from said finger and on which the seat of said spring is located.

9. A brake which is electromagnetically released and spring applied, said brake comprising a relatively fixed annular magnet frame, a shaft rotatable within said frame and provided with a hub, a disk comprising an armature and brake and keyed for rotation with said hub and for axial movement thereon toward and from said frame, said frame having a friction surface complementary to said disk and with which said disk is engageable to brake said shaft, an electromagnetic coil adapted when energized to magnetize said frame to attact said disk into frictional engagement to brake said shaft, a post mounted on said hub and projecting therefrom in the direction of disk movement to to and from brake engagement, an arm connected with said disk and having a portion projecting across said post, a cramping plate mounted on the post for free relative movement along the post in a first position normal with respect to the post and having parts crampingly engaged with the post in a titled position of the plate with respect to the post, a spring having a seat on the cramping plate and another seat on the said arm and adapted to exert bias on said arm in a direction to retract said disk from the magnet frame when the coil is de-energized, the reaction of said spring urging said cramping plate to its tilted position whereby to provide a base from which said spring can exert said bias, the said arm portion being positioned to be engaged by the cramping plate in the vicinity of the post after predetermined movement of said disk toward said magnet frame, the direction of such engagement being such as to overcome the reaction bias of said spring on said plate and to move the plate toward its first said position whereby it will move freely along the post in ensuing relative movement between the plate and post.

10. A brake according to claim 9 in which said arm has a separate stop portion spanning said plate to lie at the opposite side of the plate from the arm portion first mentioned.

References Cited

UNITED STATES PATENTS 2,808,917 10/1957 Harter.
3,091,310 5/1963 Smith et al.
3,394,787 7/1968 Fitzgerald.

CARLTON R. CROYLE, Primary Examiner

ALLAN D. HERRMANN, Assistant Examiner

U.S. Cl. X.R.

188—161, 196, 72; 192—18, 111